(12) United States Patent
Inaba et al.

(10) Patent No.: US 11,500,162 B2
(45) Date of Patent: Nov. 15, 2022

(54) CAP FOR OPTICAL CONNECTOR ADAPTER AND OPTICAL CONNECTOR ASSEMBLY

(71) Applicants: SUMITOMO ELECTRIC INDUSTRIES, LTD., Osaka (JP); SUMITOMO ELECTRIC OPTIFRONTIER CO., LTD., Yokohama (JP)

(72) Inventors: Takahiro Inaba, Yokohama (JP); Yoshikyo Tamekuni, Yokohama (JP); Daizo Nishioka, Osaka (JP); Motoyoshi Kimura, Komaki (JP)

(73) Assignees: SUMITOMO ELECTRIC INDUSTRIES, LTD., Osaka (JP); SUMITOMO ELECTRIC OPTIFRONTIER CO., LTD., Yokohama (JP)

( * ) Notice: Subject to any disclaimer, the term of this patent is extended or adjusted under 35 U.S.C. 154(b) by 80 days.

(21) Appl. No.: 17/111,566

(22) Filed: Dec. 4, 2020

(65) Prior Publication Data

US 2021/0173152 A1 Jun. 10, 2021

(30) Foreign Application Priority Data

Dec. 5, 2019 (JP) .............................. JP2019-220390

(51) Int. Cl.
*G02B 6/38* (2006.01)
(52) U.S. Cl.
CPC ......... *G02B 6/3849* (2013.01); *G02B 6/3825* (2013.01)
(58) Field of Classification Search
CPC ....... G02B 6/3849; G02B 6/3825; G02B 6/38

USPC ........................................................... 385/53
See application file for complete search history.

(56) References Cited

U.S. PATENT DOCUMENTS

| 5,794,806 | A  | * | 8/1998 | Harris | ................ | B60K 15/0406 |
| | | | | | | 220/203.26 |
| 6,438,987 | B1 | * | 8/2002 | Pahl | ................... | B65D 81/3211 |
| | | | | | | 62/343 |
| D572,661 | S  | * | 7/2008 | En Lin | .......................... | D13/133 |
| 7,568,844 | B2 | * | 8/2009 | Luther | ................. | G02B 6/3887 |
| | | | | | | 385/60 |
| 8,678,669 | B2 | * | 3/2014 | Lee | ....................... | G02B 6/3879 |
| | | | | | | 385/59 |
| 8,690,459 | B2 | * | 4/2014 | Lin | ....................... | G02B 6/3849 |
| | | | | | | 385/94 |

(Continued)

FOREIGN PATENT DOCUMENTS

| JP | 1256731 S | 11/2005 |
| JP | 1533618 S | 9/2015 |

*Primary Examiner* — Kaveh C Kianni
(74) *Attorney, Agent, or Firm* — Oliff PLC

(57) ABSTRACT

A cap for an optical connector adaptor, including: a base portion including a first surface and a second surface provided on an opposite side of the first surface; a grip portion formed by protruding from the first surface of the base portion; a fitting portion configured to protrude from the second surface of the base portion and to be fitted to an optical connector adapter; and a cover portion that is formed over the whole outer periphery of the base portion, in which the second surface includes a contact surface where the optical connector adapter and the cap for an optical connector adaptor contact each other, and in which the cover portion is configured to surround the contact surface from the outer periphery of the base portion.

9 Claims, 6 Drawing Sheets

(56) References Cited

U.S. PATENT DOCUMENTS

| | | | | |
|---|---|---|---|---|
| 8,998,503 B2* | 4/2015 | Barnette, Jr. | ............ | G02B 6/26 |
| | | | | 385/76 |
| 9,297,972 B2* | 3/2016 | Logan, Jr. | ............ | G02B 6/3831 |
| 9,411,110 B2* | 8/2016 | Barnette, Jr. | ........ | G02B 6/3849 |
| 9,791,639 B2* | 10/2017 | Zhao | .................... | G02B 6/3895 |
| 9,950,827 B1* | 4/2018 | Lau | ..................... | B65D 23/001 |
| 10,209,459 B2* | 2/2019 | Wang | ................... | G02B 6/3855 |
| 11,099,335 B2* | 8/2021 | De Jong | ............... | G02B 6/38875 |
| 2006/0045428 A1* | 3/2006 | Theuerkorn | ......... | G02B 6/3888 |
| | | | | 385/60 |
| 2007/0274658 A1* | 11/2007 | Isenhour | .............. | G02B 6/4465 |
| | | | | 385/134 |
| 2009/0099529 A1* | 4/2009 | Anderson | ............. | A61M 39/20 |
| | | | | 604/192 |
| 2012/0302997 A1* | 11/2012 | Gardner | ................ | A61M 39/20 |
| | | | | 604/533 |
| 2014/0262847 A1* | 9/2014 | Yang | .................... | F16M 13/022 |
| | | | | 206/37 |
| 2017/0264042 A1* | 9/2017 | Lueckemeier | ....... | H01R 13/443 |
| 2018/0267252 A1* | 9/2018 | Takano | ................. | B08B 7/0028 |
| 2019/0133501 A1* | 5/2019 | Rao | .................... | A61B 5/14503 |
| 2019/0282795 A1* | 9/2019 | Fangrow | ................ | A61L 2/18 |
| 2020/0150354 A1* | 5/2020 | Newbury | ............. | G02B 6/3849 |
| 2021/0173152 A1* | 6/2021 | Inaba | ................... | G02B 6/3825 |
| 2021/0373250 A1* | 12/2021 | Smith | .................. | G02B 6/3895 |

\* cited by examiner

CAP FOR OPTICAL CONNECTOR ADAPTER AND OPTICAL CONNECTOR ASSEMBLY

CROSS-REFERENCE TO RELATED APPLICATIONS

The present application claims priority from Japanese Patent Application No. 2019-220390 filed on Dec. 5, 2019, the entire content of which is incorporated herein by reference.

TECHNICAL FIELD

The present disclosure relates to a cap for an optical connector adapter and an optical connector adapter.

BACKGROUND

As a protective member for an optical connector adapter, a cap for an optical connector adapter is provided (JP Design Registration No. 1256731 and U.S. Design Registration No. D572661). Also a cap formed of an elastic member is provided (JP Design Registration No. 1533618).

SUMMARY

In JP Design Registration No. 1256731, U.S. Design Registration No. D572661, and JP Design Registration No. 1533618, from a viewpoint of attachment and detachment to and from an optical connector adapter, a cap for an optical connector adapter is configured so that a slight gap is formed between the optical connector adapter and the cap for an optical connector adapter. However, since the gap is formed therebetween, a dustproof property of the cap for an optical connector adapter deteriorates.

An object of the present disclosure is to provide a cap for an optical connector adapter and an optical connector adapter excellent in a dustproof property.

A cap for an optical connector adaptor, including: a base portion including a first surface and a second surface provided on an opposite side of the first surface; a grip portion formed by protruding from the first surface of the base portion; a fitting portion configured to protrude from the second surface of the base portion and to be fitted to an optical connector adapter; and a cover portion that is formed over the whole outer periphery of the base portion, in which the second surface includes a contact surface where the optical connector adapter and the cap for an optical connector adaptor contact each other, and in which the cover portion is configured to surround the contact surface from the outer periphery of the base portion.

According to the present disclosure, since a cover portion is formed over a whole outer periphery of a base portion and formed to surround a contact surface of an optical connector adapter and a cap for an optical connector adapter from the outer periphery of the base portion, a gap between the optical connector adapter and the cap for an optical connector adapter is covered by the cover portion, thereby making it possible to improve a dustproof property of the cap for an optical connector adapter.

DETAILED DESCRIPTION

Figure 1:
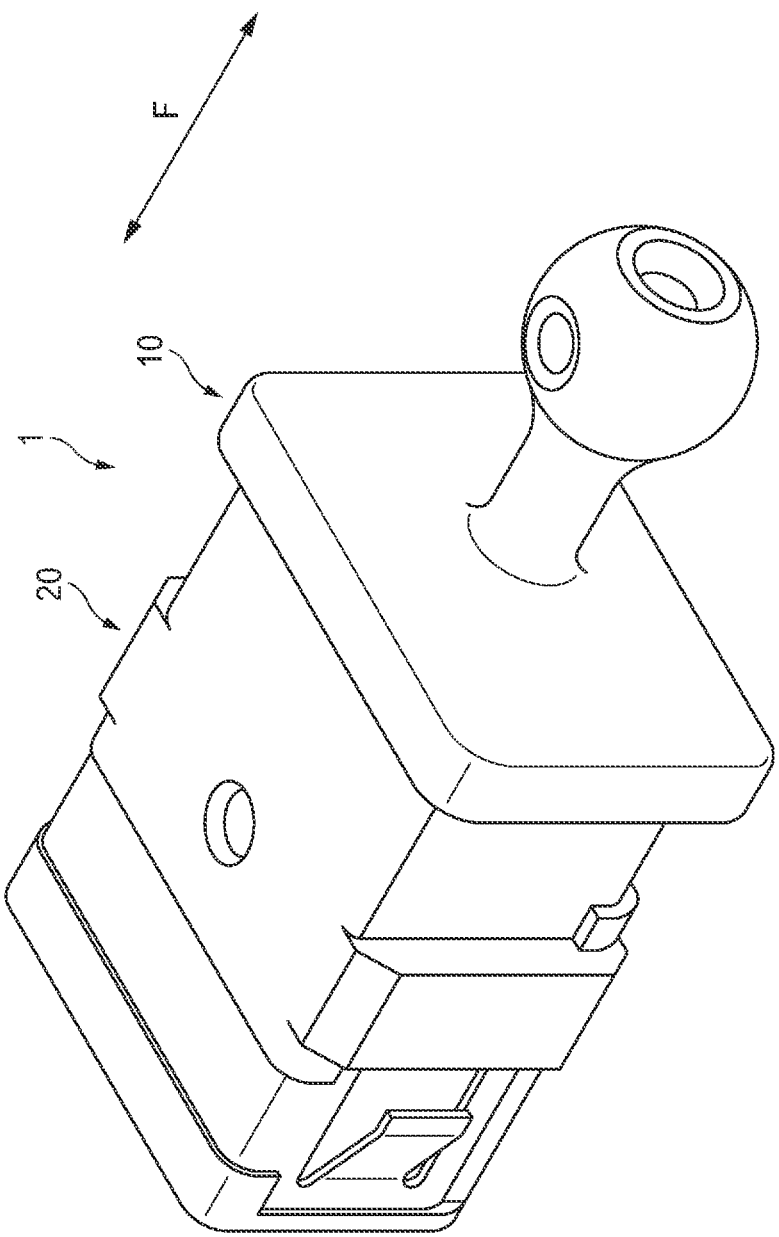
FIG. 1 is a perspective view illustrating a fitted state of a cap for an optical connector adapter and an optical connector adapter according to an illustrative embodiment of the present disclosure.

Description of an Illustrative Embodiment of the Present Disclosure

First, an illustrative aspect of the present disclosure will be listed and described.

(1) A cap for an optical connector adaptor according to the illustrative aspect of the present disclosure includes a base portion including a first surface and a second surface provided on an opposite side of the first surface, a grip portion formed by protruding from the first surface of the base portion, a fitting portion configured to protrude from the second surface of the base portion and to be fitted to an optical connector adapter, and a cover portion that is formed over the whole outer periphery of the base portion, in which the second surface includes a contact surface where the optical connector adapter and the cap for an optical connector adaptor contact each other, and in which the cover portion is configured to surround the contact surface from the outer periphery of the base portion.

Hereinafter, the cap for an optical connector adapter will be referred to as a "cap". According to the present disclosure, since the cover portion is formed over the whole outer periphery of the base portion and formed to surround the contact surface of the optical connector adapter and the cap from the outer periphery of the base portion, a gap between an end portion of the optical connector adapter and the cap is covered by the cover portion, thereby making it possible to improve a dustproof property of the cap.

(2) The cover portion may be formed by protruding from the second surface of the base portion.

According to the present disclosure, since the cover portion is formed by protruding from the second surface, the gap between the end portion of the optical connector adapter and the cap is surely covered by the cover portion, thereby making it possible to improve the dustproof property of the cap.

An external force may be applied to the grip portion, and the cap fitted to the optical connector adapter may be slightly inclined with respect to the optical connector adapter. When the cap is formed of an elastic member such as rubber, the cap is easy to be deformed and may easily fall off from the optical connector adapter. However, according to the present disclosure, since the cover portion is formed by protrude from the second surface, a protruding portion of the cover portion of the cap abuts on the optical connector adapter, thereby making it possible to prevent the cap from easily falling off from the optical connector adapter.

(3) The cover portion may be formed such that the optical connector adapter is interposed between the fitting portion and the cover portion.

Since the optical connector adapter is interposed between the fitting portion and the cover portion, both the fitting portion and the cover portion can abut on the optical connector adapter, and the gap between the end portion of the optical connector adapter and the cap is more surely covered, thereby making it possible to improve the dustproof property of the cap. Furthermore, it is possible to prevent the cap from easily falling off from the optical connector adapter.

(4) A height of the cover portion from the second surface may be lower than a height of the fitting portion from the second surface.

When the cap is fitted to the optical connector adapter, the cap and the optical connector adapter rub against each other, such that dust may be generated inside the cap. However, according to the present disclosure, since the height of the cover portion is lower than the height of the fitting portion, a contact portion between the cover portion and the optical connector adapter is smaller than a contact portion between the fitting portion and the optical connector adapter, thereby making it possible to prevent dust from being generated in the cover portion.

(5) The fitting portion includes a rib portion configured to be fitted to the optical connector adapter, and a height of the rib portion from the second surface may be lower than a height of the fitting portion from the second surface.

According to the present disclosure, since the height of the rib portion is lower than the height of the fitting portion, it is possible to reduce a contact portion between the rib portion and the optical connector adapter and to prevent dust from being generated in the rib portion. While the cover portion prevents the cap from easily falling off from the optical connector adapter, the contact portion between the rib portion and the optical connector adapter is reduced, thereby making it possible to improve detachability of the optical connector adapter and the cap.

(6) The cap further may include at least one claw portion that is provided between the cover portion and the fitting portion, in which the claw portion may be configured to be able to contact a side of the optical connector adapter.

According to the present disclosure, since the cap includes the claw portion that can contact the side of the optical connector adapter, the gap between the end portion of the optical connector adapter and the cap on the side of the optical connector adapter is reduced by the claw portion, thereby making it possible to prevent the cap from easily falling off from the optical connector adapter.

(7) The claw portion may be provided in the cover portion and configured to protrude from the cover portion toward the fitting portion.

According to the present disclosure, since the claw portion protrudes from the cover portion toward the fitting portion, the optical connector adapter does not rub against the whole inner surface of the cover portion of the cap, but slides against the fitting portion and a part of the inner surface of the cover portion, thereby making it possible to reduce dust generation in the cover portion. The claw portion may be provided in the fitting portion, but it is desirable that the claw portion is provided in the cover portion. When the claw portion is provided in the cover portion provided in the outer periphery of the base portion, the cap more firmly contacts an outer surface of the optical connector adapter compared to a case where the claw portion is provided in the fitting portion fitted to the optical connector adapter, such that the optical connector adapter is much less affected by the dust generation.

(8) The cover portion may be a rectangular shape, and in which the claw portion may be provided on at least one short side of the cover portion.

When the cover portion has a rectangular shape, a looseness between the optical connector adapter and the cap in a direction along the long side of the cover portion is larger than a looseness between the optical connector adapter and the cap in a direction along the short side of the cover portion. However, according to the present disclosure, since the claw portion is provided on the short side of the cover portion, it is possible to reduce the looseness between the optical connector adapter and the cap in the direction along the long side of the cover portion.

(9) The at least one claw portion may include a plurality of claw portions, and in which at least one claw portion of the plurality of claw portions may be provided on each short side of the cover portion.

According to the present disclosure, since the claw portion contacts the optical connector adapter from the both short sides, it is possible to reduce the looseness between the optical connector adapter and the cap in the direction along the long side of the cover portion.

(10) An optical connector assembly includes an optical connector adapter and the cap.

According to the present disclosure, since the gap between the end portion of the optical connector adapter and the cap is covered by the cover portion, the dustproof property of the optical connector assembly can be improved.

Details of an Illustrative Embodiment of the Present Disclosure

A specific example of a cap for an optical connector adapter and an optical connector assembly according to an illustrative embodiment of the present disclosure will be described with reference to the accompanying drawings.

The present disclosure is not limited to the examples but is indicated by the scope of claims, and is intended to include all the modifications within the meanings equivalent to the scope of the claims and within the scope thereof.

Figure 2:
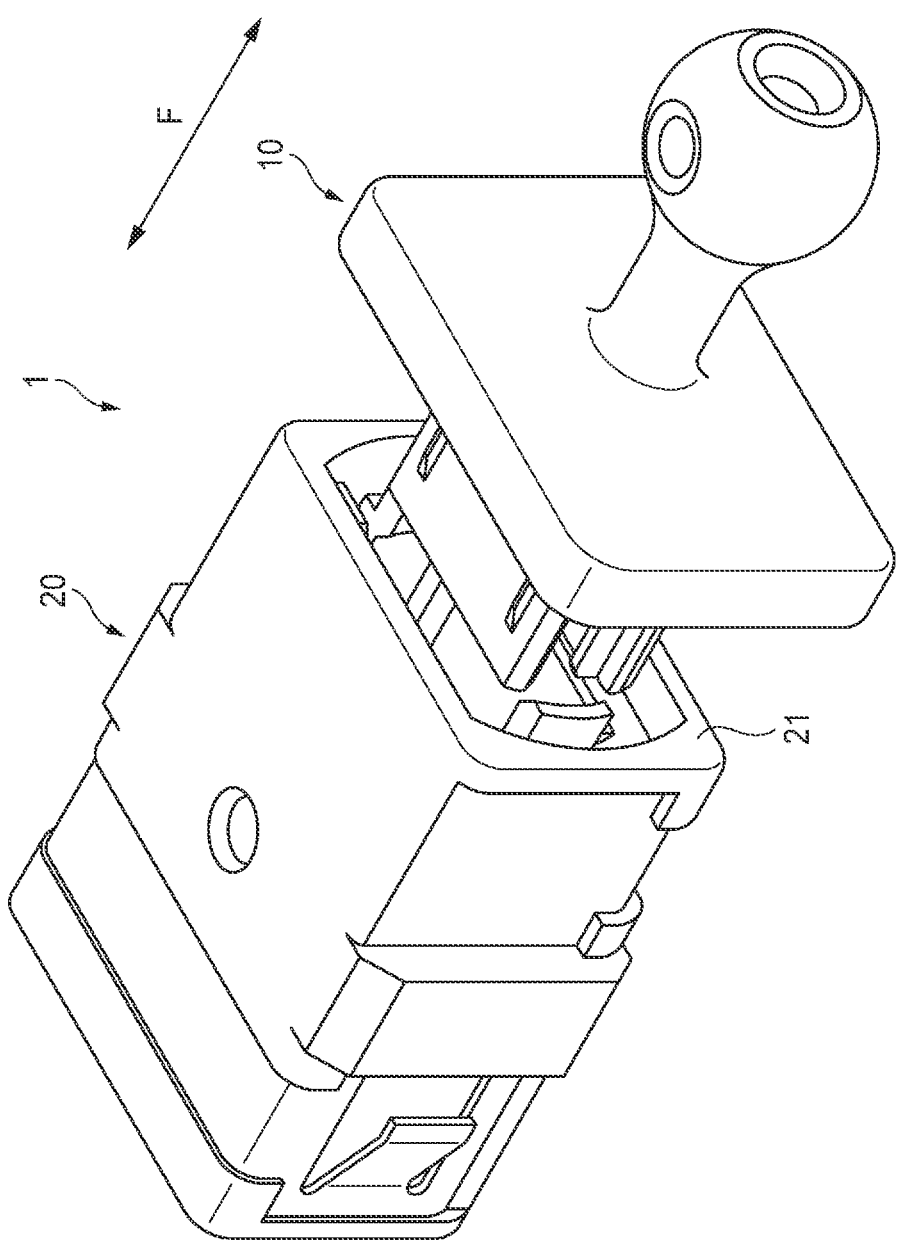
FIG. 2 is an exploded perspective view of the cap for an optical connector adapter and the optical connector adapter.

FIGS. 1 and 2 are perspective views illustrating an illustrative example of an optical connector assembly 1 according to an illustrative embodiment of the present disclosure. As illustrated in FIGS. 1 and 2, the optical connector assembly 1 includes a cap for an optical connector adapter 10 and an optical connector adapter 20. Hereinafter, the cap for an optical connector adapter 10 is referred to as a "cap 10". FIG. 1 is a perspective view illustrating a state in which the cap 10 and the optical connector adapter 20 are fitted to each other. FIG. 2 is an exploded perspective view illustrating a state in which the cap 10 and the optical connector adapter 20 are not fitted to each other.

In FIGS. 1 and 2, F indicates a direction in which the cap 10 is fitted into the optical connector adapter 20. In the illustrative embodiment, a side of the cap 10 in the F direction is defined as an "upper side" and a side of the optical connector adapter 20 is defined as a "lower side".

The optical connector adapter 20 is an adapter configured so that an optical connector plug connected to an end portion of a cable such as an MPO cable or an end portion of an optical fiber is inserted thereinto. For example, a plurality of optical connector adapters 20 may be provided in an MPO cassette. When the optical fiber or cable is not inserted into the optical connector adapter 20, and particularly when the optical connector adapter 20 is not used, an opening of the optical connector adapter 20 may be covered to prevent dust and dirt from entering the inside of the optical connector adapter 20. In the illustrative embodiment, the cap 10 which is a separate member from the optical connector adapter 20 is configured to be fitted into the opening of the optical connector adapter 20. Specifically, as illustrated in FIGS. 1 and 2, the cap 10 is configured to be fitted to an opening edge 21 of the optical connector adapter 20.

A material of the cap 10 is not particularly limited, and is desirably formed of synthetic resin which is harder than an elastic member such as rubber. When the cap 10 is formed of the elastic member, the cap 10 is easy to be elastically deformed, such that the cap 10 may easily fall off from the optical connector adapter 20. However, when the cap 10 is formed of synthetic resin which is harder than the elastic member, the cap 10 is hard to be deformed, such that the cap 10 can be prevented from easily falling off from the optical connector adapter 20.

Figure 3:
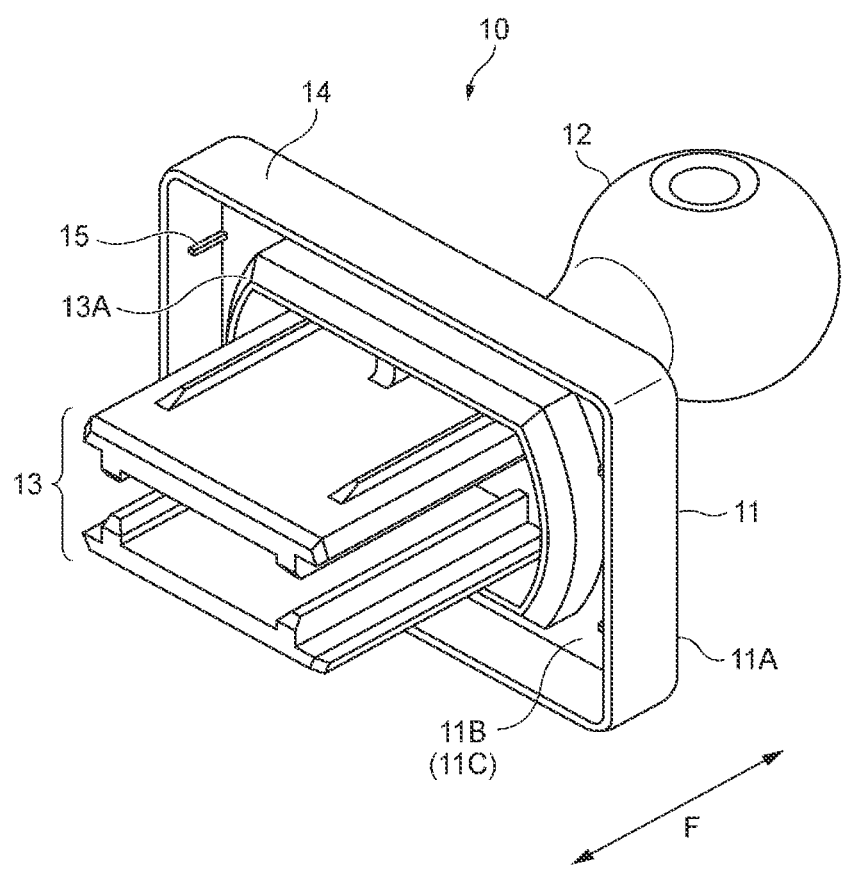
FIG. 3 is a downward perspective view of the cap for an optical connector adapter.
Figure 4:
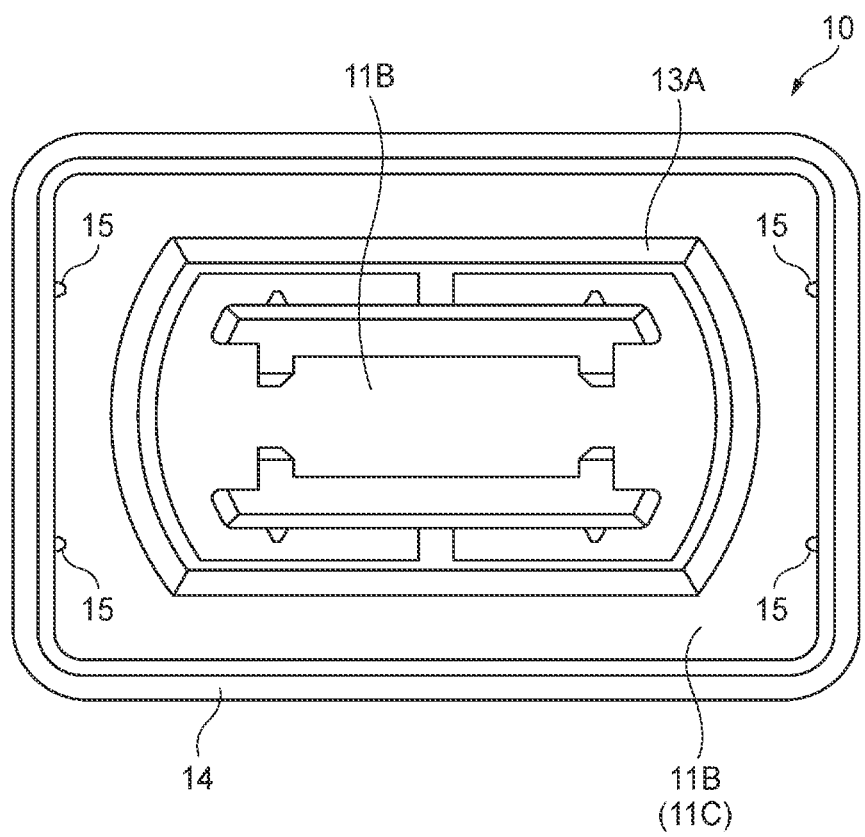
FIG. 4 is a bottom view of the cap for an optical connector adapter.

FIG. 3 illustrates a downward perspective view of the cap 10. FIG. 4 illustrates a bottom view of the cap 10. As illustrated in FIGS. 3 and 4, the cap 10 includes a base portion 11 serving as a base of the cap 10, a grip portion 12, a fitting portion 13 configured to be fitted to the optical connector adapter 20, and a cover portion 14.

The base portion 11 of the cap 10 is a member configured to serve as the base of the cap 10, and includes a first surface 11A and a second surface 11B provided on an opposite side of the first surface 11A. A shape of the base portion 11 is not particularly limited as long as the second surface 11B of the base portion 11 is configured to cover the opening of the optical connector adapter 20.

The second surface 11B includes a contact surface 11C where the optical connector adapter 20 and the cap 10 contact each other. More specifically, when the cap 10 and the optical connector adapter 20 are fitted to each other, a portion where the opening edge 21 of the optical connector adapter 20 and the second surface 11B of the cap 10 contact each other becomes the contact surface 11C.

The grip portion 12 is formed by protruding from the first surface 11A of the base portion 11. For example, the grip portion 12 is a protruding portion configured so that a user can easily handle the cap 10 when the user attaches or detaches the cap 10 to or from the optical connector adapter 20. A location of the grip portion 12 with respect to the base portion 11 is not particularly limited, and in a viewpoint of stability when the cap 10 is attached and detached thereto or therefrom, it is desirable that the grip portion 12 protrudes from a central portion of the first surface 11A of the base portion 11. A shape of the grip portion 12 is not particularly limited. In the illustrative embodiment, while a spherical body is integrally formed at a tip portion of the grip portion 12 so that the user can easily grip the grip portion 12, the present invention is not limited thereto.

The fitting portion 13 is formed by protruding from the second surface 11B of the base portion 11 at a central portion of the base portion 11. A shape of the fitting portion 13 is not particularly limited as long as the shape thereof is configured to be fitted to the optical connector adapter 20. A location of the fitting portion 13 with respect to the base portion 11 is not also necessarily required to be the central portion of the base portion 11 as long as the location thereof is configured to allow the fitting portion 13 to be fitted to the optical connector adapter 20. In the illustrative embodiment, the fitting portion 13 is formed integrally with the base portion 11, and may be formed of a member different from the base portion 11.

The fitting portion 13 includes a rib portion 13A that is formed by protruding from the second surface 11B of the base portion 11 and is configured to be fitted to the optical connector adapter 20. A shape of the rib portion 13A is not particularly limited as long as the shape thereof is configured to allow the rib portion 13A to be fitted to the optical connector adapter 20. In the illustrative embodiment, the rib portion 13A is configured to contact an inner peripheral surface of the opening edge 21 of the optical connector adapter 20. The rib portion 13A is configured to surround a periphery of the fitting portion 13. By providing the rib portion 13A, the illustrative embodiment can improve the mounting performance of the cap 10 with respect to the optical connector adapter 20 and can reinforce intensity of the fitting portion 13 with respect to the base portion 11.

Figure 5:
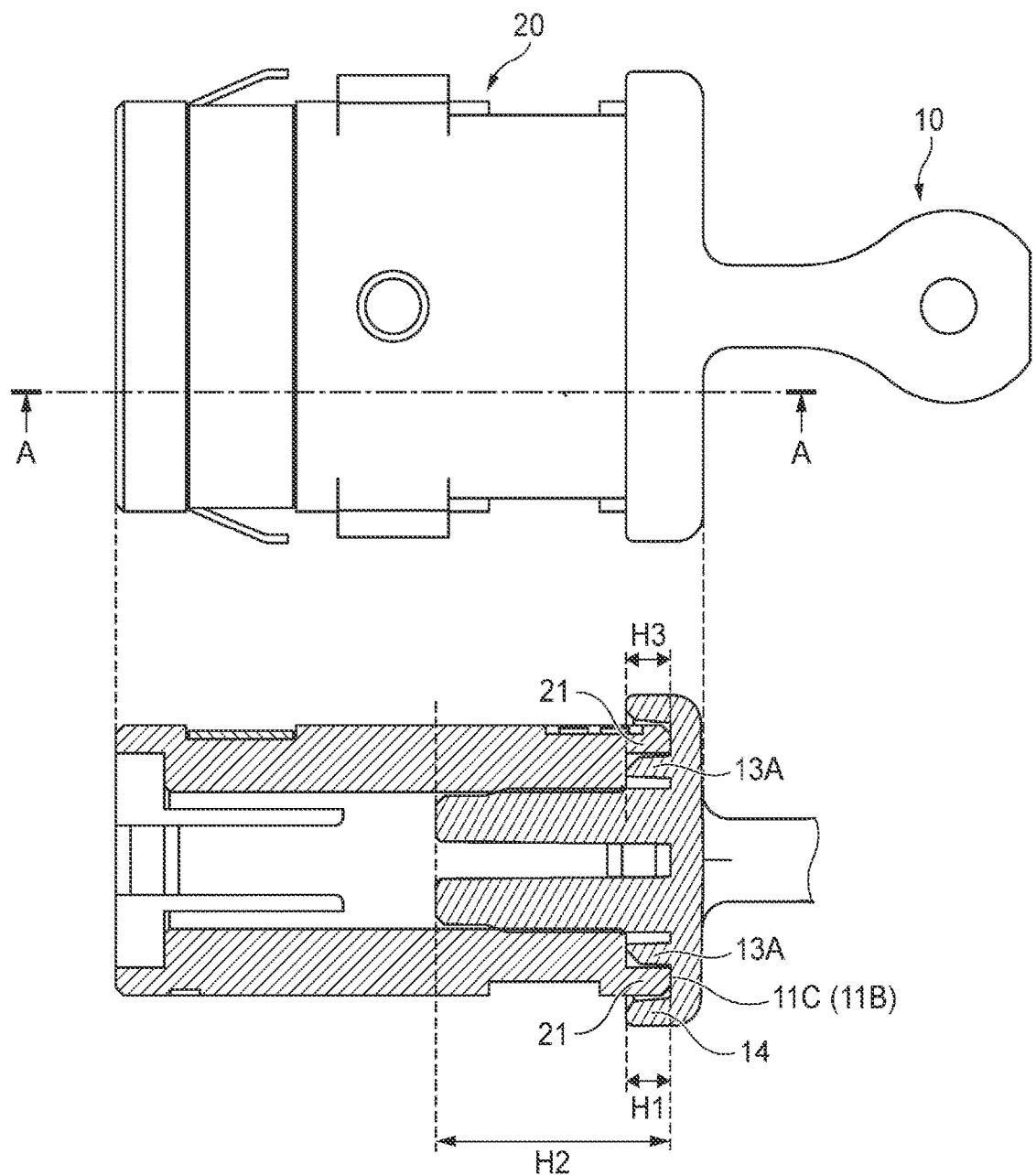
FIG. 5 is a plan view and a cross-sectional view illustrating a fitted state of the optical connector adapter and the cap for an optical connector adapter.
Figure 6:
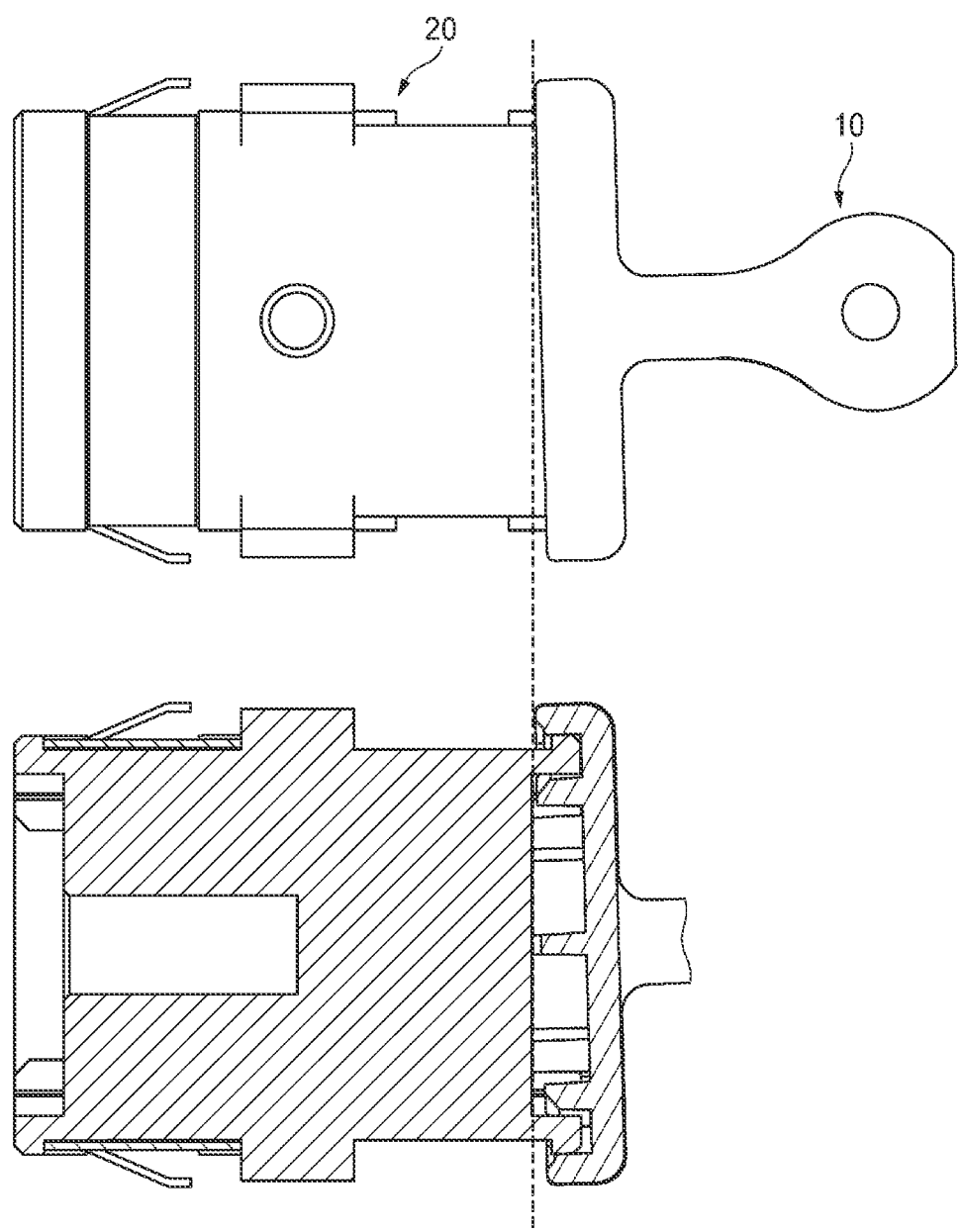
FIG. 6 is a plan view and a cross-sectional view illustrating a state in which the cap for an optical connector adapter is fitted to the optical connector adapter in an inclined state.

Next, the cover portion 14 will be described. FIG. 5 is a plan view illustrating a state in which the cap 10 is fitted to the optical connector adapter 20 in a cross-sectional view perpendicular to the direction in which the cap 10 is fitted to the optical connector adapter 20, and a cross-sectional view taken along the line A-A of the plan view. FIG. 6 is a plan view illustrating a state in which the cap 10 is fitted to the optical connector adapter 20 in an inclined state, and a cross-sectional view of the plan view.

The cover portion 14 is formed over the whole outer periphery of the base portion 11. The cover portion 14 is configured to surround the contact surface 11C from the outer periphery of the base portion 11. In other words, the cover portion 14 is configured to surround an outer periphery of the opening edge 21 of the optical connector adapter 20. A general cap is configured so that a slight gap is formed between the cap and the optical connector adapter in a viewpoint of the attachment and detachment to and from the optical connector adapter. The gap is required to be improved in a viewpoint of a dustproof property of the cap. According to the illustrative embodiment, as illustrated in FIG. 5, since the cover portion 14 is formed to surround the contact surface 11C between the optical connector adapter 20 and the cap 10 from the outer periphery of the base portion 11, the gap between the optical connector adapter 20 and the cap 10 is covered by the cover portion 14, such that the dustproof property of the cap 10 can be improved.

In the illustrative embodiment, the cover portion 14 is formed by protruding from the second surface 11B of the base portion 11. Since the cover portion 14 is formed to protrude from the second surface 11B and to surround the contact surface 11C between the optical connector adapter 20 and the cap 10, the gap between the optical connector adapter 20 and the cap 10 is surely covered by a protruding portion of the cover portion 14, such that the dustproof property of the cap 10 can be further improved.

When an external force is applied to the grip portion 12, the cap 10 fitted to the optical connector adapter 20 may be slightly inclined with respect to the optical connector adapter 20. As illustrated in FIG. 6, when the cap 10 is inclined with respect to the optical connector adapter 20, the cap 10 may be easily detached and fall off from the optical connector adapter 20. However, in the illustrative embodiment, since the cover portion 14 is formed by protruding from the second surface 11B, the protruding portion of the cover portion 14 of the cap 10 abuts on the optical connector adapter 20, thereby making it possible to prevent the cap 10 from easily falling off from the optical connector adapter 20.

In the illustrative embodiment, the cover portion 14 is formed so that the optical connector adapter 20 is interposed between the fitting portion 13 and the cover portion 14. More specifically, the cover portion 14 is formed so that the optical connector adapter 20 is interposed between the rib portion 13A of the fitting portion 13 and the cover portion 14. When the cap 10 and the optical connector adapter 20 are fitted to each other, the optical connector adapter 20 is interposed between the rib portion 13A of the fitting portion 13 and the cover portion 14, such that both the rib portion 13A of the fitting portion 13 and the cover portion 14 abut on the optical connector adapter 20. Therefore, according to the illustrative embodiment, it is possible to prevent the cap 10 from easily falling off from the optical connector adapter 20.

When the optical connector adapter 20 is interposed between the rib portion 13A of the fitting portion 13 and the cover portion 14, the opening edge 21 of the optical connector adapter 20 is surrounded by the cover portion 14, the base portion 11 (contact surface 11C), and the rib portion 13A of the fitting portion 13. In other words, as illustrated in FIGS. 5 and 6, three portions including the outer periphery of the opening edge 21 of the optical connector adapter 20, the surface of the contact surface 11C side, and an inner periphery thereof are surrounded by the cap 10. Therefore, according to the illustrative embodiment, it is possible not only to improve the dustproof property of the cap 10, but also to prevent the cap 10 from easily falling off from the optical connector adapter 20.

A height H1 of the cover portion 14 from the second surface 11B is lower than a height H2 of the fitting portion 13 from the second surface 11B. When the cap 10 is fitted to the optical connector adapter 20, the cap 10 and the optical connector adapter 20 rub against each other, such that dust may be generated inside the cap 10. However, according to the illustrative embodiment, since the height H1 of the cover portion 14 is lower than the height H2 of the fitting portion 13, a contact portion between the cover portion 14 and the optical connector adapter 20 is smaller than a contact portion between the fitting portion 13 and the optical connector adapter 20, thereby making it possible to prevent dust from being generated in the cover portion 14.

A height H3 of the rib portion 13A from the second surface 11B is desirably lower than the height H2 of the fitting portion 13 from the second surface 11B. When the height H3 of the rib portion 13A is lower than the height H2 of the fitting portion 13, a contact portion between the rib portion 13A and the optical connector adapter 20 is reduced, thereby making it possible to prevent dust from being generated in the rib portion 13A.

The height H1 of the cover portion 14 from the second surface 11B is desirably the same as the height H3 of the rib portion 13A from the second surface 11B. Since the height H1 of the cover portion 14 and the height H3 of the rib portion 13A are the same, it is possible to improve detachability of the cap 10 with respect to the optical connector adapter 20 while preventing dust generation inside the cap 10.

The cap 10 includes, between the cover portion 14 and the fitting portion 13, at least one claw portion 15 that can contact the side of the optical connector adapter 20. More specifically, the claw portion 15 is configured to contact at least any one of the outer periphery or an inner periphery of the opening edge 21 of the optical connector adapter 20. In the illustrative embodiment, the claw portion 15 causes the gap between the opening edge 21 of the optical connector adapter 20 and the cap 10 to be reduced, thereby making it possible to prevent the cap 10 from easily falling off from the optical connector adapter 20.

The claw portion 15 is provided in the cover portion 14 and is formed to protrude from the cover portion 14 toward the fitting portion 13. Here, the claw portion 15 is configured to contact the outer periphery of the opening edge 21 of the optical connector adapter 20. Since the claw portion 15 protrudes from the cover portion 14 toward the fitting portion 13, the optical connector adapter 20 does not rub against the whole inner surface of the cover portion 14 of the cap 10 but slides against the fitting portion 13 and a part of the inner surface of the cover portion 14, thereby making it possible to reduce dust generation in the cover portion 14.

The claw portion 15 may be provided in the fitting portion 13 and may be formed to protrude from the fitting portion 13 toward the cover portion 14. In this case, the claw portion 15 is configured to contact the inner periphery of the opening edge 21 of the optical connector adapter 20. However, in a viewpoint of preventing the dust generation, it is desirable that the claw portion 15 is provided in the cover portion 14. When the claw portion 15 is provided in the cover portion 14 provided in the outer periphery of the base portion 11, the cap 10 more firmly contacts an outer surface of the opening edge 21 of the optical connector adapter 20 compared to a case where the claw portion 15 is provided in the fitting portion 13 fitted to the optical connector adapter 20, such that the optical connector adapter 20 is much less affected by the dust generation. In other words, the optical connector adapter 20 is much less affected by the dust generation when the claw portion 15 is provided in the cover portion 14 and contacts the outer periphery of the opening edge 21 of the optical connector adapter 20 compared to the case where the claw portion 15 is provided in the fitting portion 13 and contacts the inner periphery of the opening edge 21 of the optical connector adapter 20.

A shape of the cover portion 14 may be a rectangular shape. When the cover portion 14 has the rectangular shape, it is desirable that the claw portion 15 is provided on at least one short side of the cover portion 14. When the cover portion 14 has the rectangular shape, a looseness between the optical connector adapter 20 and the cap 10 in a direction along the long side of the cover portion 14 is larger than a looseness between the optical connector adapter 20 and the cap 10 in a direction along the short side of the cover portion 14. In the illustrative embodiment, since the claw portion 15 is provided on the short side of the cover portion 14, it is possible to reduce the looseness between the optical connector adapter 20 and the cap 10 in the direction along the long side of the cover portion 14.

The cap 10 includes a plurality of claw portions 15. In the illustrative embodiment, four claw portions 15 are provided, but the number of claw portions 15 is not limited. It is desirable that at least one claw portion 15 of the plurality of claw portions 15 is provided on each short side of the cover portion 14. Since the claw portion 15 contacts the optical connector adapter 20 from the both short sides, it is possible to reduce the looseness between the optical connector adapter 20 and the cap 10 in the direction along the long side of the cover portion 14.

While the present disclosure has been described above in detail or with reference to the specific embodiments, it is obvious to those skilled in the art that various changes and modifications can be added without departing from the spirit and scope of the present disclosure. The number, position, and shape of the above-described components are not limited to the above-described illustrative embodiment, and can be changed to the number, position, and shape desirable for performing the present disclosure.

What is claimed is:

1. A cap for an optical connector adaptor, comprising:
   a base portion including a first surface and a second surface provided on an opposite side of the first surface;
   a grip portion formed by protruding from the first surface of the base portion;
   a fitting portion configured to protrude from the second surface of the base portion and to be fitted to an optical connector adapter; and a cover portion that is formed over a whole outer periphery of the base portion, wherein the second surface includes a contact surface where the optical connector adapter and the cap contact each other, wherein the cover portion is configured to surround the contact surface from the outer periphery of the base portion, and wherein the cover portion is formed such that the optical connector adapter is interposed between the fitting portion and the cover portion.

2. The cap according to claim 1, wherein the cover portion is formed by protruding from the second surface of the base portion.

3. The cap according to claim 1, wherein a height of the cover portion from the second surface is lower than a height of the fitting portion from the second surface.

4. The cap according to claim 1, wherein the fitting portion comprises a rib portion configured to be fitted to the optical connector adapter, and wherein a height of the rib portion from the second surface is lower than a height of the fitting portion from the second surface.

5. The cap according to claim 1, further comprising:

at least one claw portion that is provided between the cover portion and the fitting portion, wherein the claw portion is configured to be able to contact a side of the optical connector adapter.

6. The cap according to claim 5, wherein the claw portion is provided in the cover portion and configured to protrude from the cover portion toward the fitting portion.

7. The cap according to claim 5, wherein the cover portion is a rectangular shape, and wherein the claw portion is provided on at least one short side of the cover portion.

8. The cap according to claim 7, wherein the at least one claw portion includes a plurality of claw portions, and wherein at least one claw portion of the plurality of claw portions is provided on each short side of the cover portion.

9. An optical connector assembly, comprising:

an optical connector adapter; and the cap according to claim 1.

* * * * *